United States Patent [19]
Pinto et al.

[11] Patent Number: 5,492,016
[45] Date of Patent: Feb. 20, 1996

[54] CAPACITIVE MELT PRESSURE MEASUREMENT WITH CENTER-MOUNTED ELECTRODE POST

[75] Inventors: Gino A. Pinto, Lowell, Mass.; Leif E. Lawhite, South Royalton, Vt.; Gerard Eggleston, Danvers, Mass.; Robert B. Carr, Dedham, Mass.; Boruch B. Frusztajer, Lexington, Mass.

[73] Assignee: Industrial Sensors, Inc., Lowell, Mass.

[21] Appl. No.: 162,167

[22] PCT Filed: Jun. 15, 1992

[86] PCT No.: PCT/US92/04982

§ 371 Date: Dec. 14, 1993

§ 102(e) Date: Dec. 14, 1993

[87] PCT Pub. No.: WO92/22794

PCT Pub. Date: Dec. 3, 1992

[51] Int. Cl.⁶ ............................................ G01L 9/12
[52] U.S. Cl. ........................ 73/724; 73/708; 361/283.4
[58] Field of Search ........................... 73/708, 718, 724, 73/756; 361/283.3, 283.4

[56] References Cited

U.S. PATENT DOCUMENTS

| | | | |
|---|---|---|---|
| 3,277,721 | 10/1966 | Bader | 73/715 |
| 3,381,190 | 4/1968 | Hoogenboom | 73/724 X |
| 4,357,834 | 11/1982 | Kimura | 73/708 |
| 4,449,409 | 5/1984 | Antonazzi | 73/708 |
| 4,468,968 | 9/1984 | Kee | 73/708 |
| 4,711,129 | 12/1989 | Studenberg et al. | 73/715 X |
| 5,088,329 | 2/1992 | Sahagen | 73/727 |

OTHER PUBLICATIONS

Sensotron Brochure, "Series 400 Polymer Extrusion–Melt Pressure Transducer", four pages.

*Primary Examiner*—Richard Chilcot
*Assistant Examiner*—Joseph L. Felber
*Attorney, Agent, or Firm*—Fish & Richardson

[57] ABSTRACT

A melt pressure measurement probe for insertion through wall of melt-containing vessel has a pressure-deflectable end portion for contact with pressurized melt. Pressure-resistant securing means fixes the end surface in a non-flow obstruction relationship. A seal surface on the probe prevents exposure of the melt to the securing means. Pressure detection means internal of the probe, responsive to deflection of the probe end surface to detect melt pressure, comprises a temperature-compensated capacitive sensor, one capacitor plate defined by the end portion and an opposite capacitor plate in the probe with a capacitive gap in-between. Electronic circuitry remote from the melt-exposed end, including circuitry within the probe to generate a signal proportional to the capacitance, compensates for change of temperature of the capacitor to generate an output signal proportional to melt pressure.

13 Claims, 14 Drawing Sheets

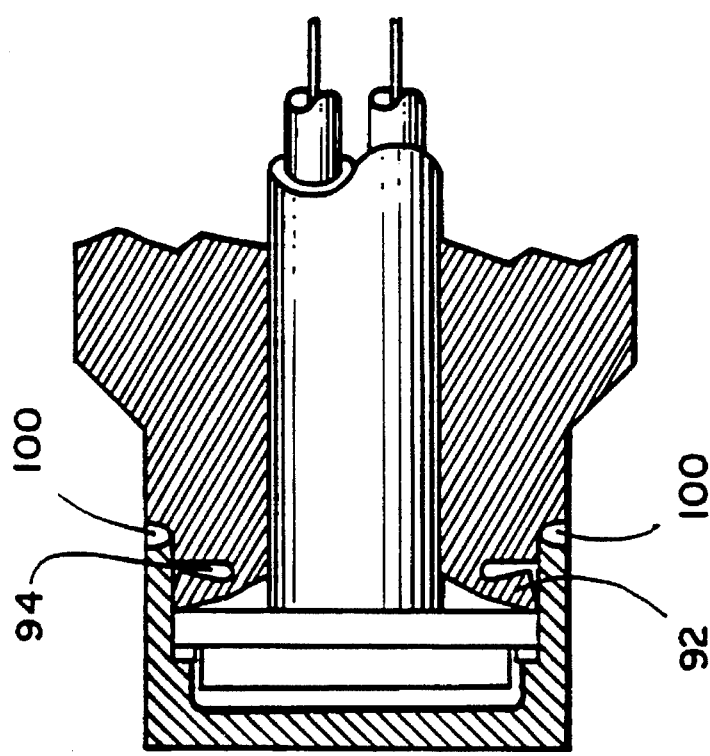
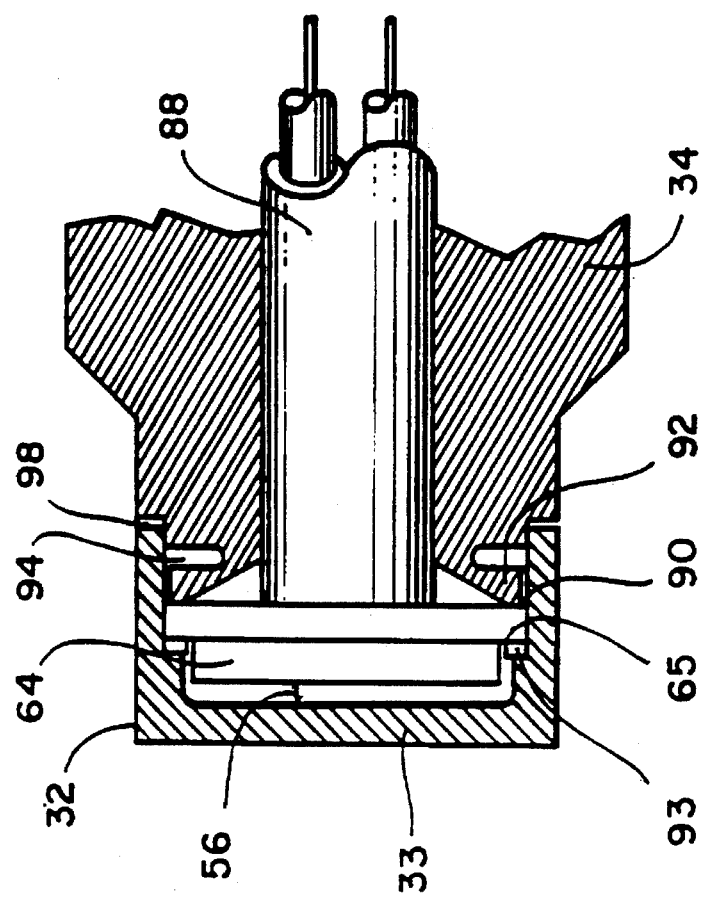
FIG. 7A
FIG. 7B

CAPACITIVE MELT PRESSURE MEASUREMENT WITH CENTER-MOUNTED ELECTRODE POST

BACKGROUND OF THE INVENTION

This invention relates to pressure transducers.

In a key respect, the invention relates to melt pressure measurement of plastically deformable materials, for example, synthetic resins, pastes, slurries, and food substances. Plastic materials such as these are melted or mixed and then extracted or injection molded to form solid objects such as injection molded parts, extruded shapes, fibers, extruded film, and shaped food stuffs. During the process, the material is typically heated to a desired temperature, which may range as high as 1000° F., and worked under a desired pressure, which may range as high as 20,000 or 30,000 psi or higher.

It is important to accurately measure the pressure of the material while it is processed in both manufacturing and laboratory settings. In rheological studies, for example, the mixing, flow, viscosity, and separation properties of the plastic material being extruded through a vessel are all detected and analyzed as a function of the melt pressure of the material within the vessel. In manufacturing applications, the melt pressure of the material being extruded or injection molded is monitored for quality control of the process parameters as well as to guard against dangerous conditions resulting from equipment malfunction.

Referring to FIG. 1a, as currently practiced in industry, a conventional melt pressure transducer 10 is typically installed in one or more apertures 11 located along the length of an extruder barrel 12 to measure the melt pressure of the molten material as it flows past the transducer and toward, for example, an extrusion die 14. As shown in FIG. 1b, a conventional melt pressure transducer 10 consists of a hollow, elongated rod-shaped housing having a flat diaphragm 16 located at the end of the rod tip 18. Threads 20 along the outside of the housing mate with corresponding threads in the extruder barrel aperture 11 to mechanically fix the transducer in the aperture such that the tip diaphragm 16 is exposed to the melt stream in the barrel bore. A high pressure seal is formed between the high pressure chamber and the threads so that the melted plastic will not reach the threads, and the probe is sufficiently long to extend through the thickness of the barrel, e.g., 2 inches or 4 inches, and through barrel band heaters and thermal insulation.

Pressure exerted on the tip diaphragm 16 by the melt stream is transferred outwardly from the melt to a second, sensing diaphragm 22 within the housing by way of a push rod or a liquid-filled capillary tube within the housing (both shown generically as 24). Mercury is typically used as the capillary liquid, except for temperatures above its boiling point, where a sodium-potassium mixture may be used. The melt pressure applied to the tip diaphragm 16 is transferred to the fill liquid which exerts this pressure on the sensing diaphragm 22 via the capillary tube 24. A strain gauge bridge (not shown) mounted on the second diaphragm 22 senses diaphragm strain, caused by the pressurized liquid, which results in bridge resistance changes. Circuitry (not shown) interfaces with the strain gauge bridge to generate a signal indicative of the melt pressure. Pressure on the tip diaphragm 16 is transferred to a remote diaphragm 22 for sensing and measuring because the high temperature prohibits reliable bonding to and operation of the strain gauges.

The use of either a push rod or a liquid-filled capillary to transmit pressure from the tip diaphragm 16 to a second remote diaphragm 22 significantly limits the performance of conventional melt pressure transducers. Typically, the diaphragms, push rod (if used), and housing are all of thermally conductive materials, which differentially expand or contract in response to changes in temperature. Slight differences in thermal expansion coefficients or thermal gradients can cause a differential expansion between the housing and push rod which results in the application of pressure (in addition to the melt pressure) on the sensing diaphragm, thereby distorting the transducer's pressure measurement. Due to this temperature sensitivity, push rod transducers are quite thermally unstable and hence limited in their accuracy and dependability.

Liquid-filled pressure transducers, while exhibiting better temperature stability than push rod transducers, pose serious safety hazards; abrasion of the transducer tip diaphragm or cyclic fatigue can cause leakage of the liquid, typically highly toxic Mercury, into the melt. In addition, the boiling point of the liquid sets the upper boundary of melt temperature to which the transducer may be exposed; for Mercury, the upper temperature limit is about 750° F. Sodium-potassium, while capable of use at higher temperatures, is a spontaneously combustible substance which presents particular hazards in manufacture of the transducer, as well as in use.

Finally, both push rod and liquid-filled transducer designs place an inherent limitation on the frequency response of the transducers. The useful frequency bandwidth is inversely proportional to the length of the push rod or capillary tube; the longer the rod or capillary, the more severely the useful frequency range is restricted. This restriction limits, e.g., the scope of rheological data that may be gathered using the transducer. For such reasons there has been a need for better means for melt pressure measurement.

SUMMARY OF THE INVENTION

In a first aspect, the invention features a melt pressure measurement device for measuring the pressure of a melted substance useful in cooled state for forming solid objects. The device comprises a probe for insertion through an aperture in a wall of a melt-containing vessel, with the probe having a pressure-deflectable end surface for contact with pressured melt. The probe has pressure-resistent securing means for fixing the probe in the wall with the end surface of the probe exposed for contact with the melt in a non-flow obstructive relationship. A seal surface on the probe between the end of the probe and the securing means provides cooperative sealing action with a mating sealing means associated with the wall to prevent exposure of the melt to the securing means. The probe also has pressure detection means internal of the probe, responsive to deflection of the end surface of the probe, for detecting pressure of the melt. The pressure detection means comprises a temperature-compensated capacitive sensor, with one plate of the capacitor defined by the end surface of the probe exposed to the melt and the opposite plate of the capacitor mounted within the probe in spaced relation to the end surface. A capacitive gap being is defined by the end surface and the opposite plate. The probe also has electronic circuitry remote from the melt-exposed end of the probe and connected to the capacitor in a manner to compensate for change of temperature effects on the capacitor, and to generate an output signal proportional to the melt pressure. The circuitry also comprises circuitry mounted within a portion of the probe to generate a signal proportional to the capacitance of the capacitive sensor.

In various embodiments of the invention, the circuitry for generating a capacitance signal is at least six inches from the end surface of the probe, and all of the electronic circuitry is mounted within a portion of the probe. The end surface comprises a flexible plate having an outer face for contact with the melt and an opposite inner face at the center of which is a connection member integral to the plate. The opposite plate of the capacitor comprises a rigid disk of homogeneous material having a first face joined at its center to the connection member of the flexible plate. A conducting region on the first face, located radially beyond the joint to the connection member, forms a capacitor with a respective portion of the flexible plate's inner face. A portion of the flexible plate nearest its periphery is substantially unaffected by melt pressure, and so is substantially fixed form translating with respect to the probe, as compared to the center portion of the plate, which translates in response to melt pressure. Thus the spaced relation between the conducting region of the disk and the respective portion of the plate's inner face changes in response to melt pressure. The flexible plate is circular, with a diameter not exceeding 0.40 inches. The rigid disk comprises an insulating material and the conducting region is defined on the disk by a layer of deposited conducting material. The outer face of the flexible plate is contoured such that the thickness of the plate decreases from the outer periphery radially inward to a point of minimum thickness and increases from that point to the plate's center.

In various other embodiments, the invention features the flexible plate and the opposite plate each having a peripheral boundary fixed within the probe, with the opposite plate being fixed from translating with respect to the probe. The probe comprises a first material having a first thermal expansion coefficient and the opposite capacitor plate comprises a second material having a second thermal expansion coefficient. The first and second materials are chosen such that the dimensions of the probe and the opposite capacitor plate change in response to changes in temperature, thereby effecting a capacitor gap width change in response to a change in melt temperature. This gap width change results in a decrease in capacitor sensitivity which compensates for increased capacitor sensitivity caused by temperature-induced decreases in the flexural rigidity of the pressure-deflectable end face of the probe. The first and second materials are chosen such that the capacitive sensor is operative for melt temperatures ranging between 70° F. and 1000° F.

In various other embodiments, the invention also features a capacitive sensor which is effectively comprised of at least two capacitors; one plate of each of the capacitors being defined by a respective portion of the end surface of the probe, and the opposite plate of each of the capacitors mounted within the probe in a fixed manner and each forming a capacitor with a respective portion of the end surface. The gaps of the capacitors, and hence their capacitances, are affected substantially identically by increases or decreases in melt temperature at zero melt pressure, while the respective portions of the end face are affected differently by said melt pressure, whereby the capacitances are affected differently by the melt pressure, with one capacitor being more affected by melt pressure than the other capacitors. The circuitry is connected to the capacitors in a manner to generate an output signal independent of melt temperature.

In other embodiments, the invention features a pressures-deflectable end surface of the probe which has a diameter less than the diameter of the remote portion of the probe; an inward step in the probe surface accommodates the change in probe diameter. The opposite capacitor plate comprises a disk with a first face separated from the probe end surface to define a capacitor gap, and a second, opposite face, with the disk having an inward step corresponding to the step in the probe such that the diameter of the first face is less than the diameter of the said second face. The height of the step in the probe and the step in the disk is chosen to affect a predetermined change in the capacitor gap width as a function of temperature; the height being a function of the first and second thermal expansion coefficients, the maximum deflection of the center of the end surface, the capacitor gap spacing, and the temperature dependence of the modulus of the end surface, whereby said gap width change results in a decrease in capacitor sensitivity which compensates for increased capacitor sensitivity caused by temperature-induced decreases in the flexural rigidity of the end face of the probe. The first face of the disk comprises at least two isolated conducting regions each having the same area. Each of the conducting regions defines a distinct capacitive gap with a respective portion of the end surface of the probe, whereby the capacitive sensor is effectively comprised of at least two capacitors. The probe end surface comprises nickel alloy and the disk comprises alumina.

In various other embodiments, the invention provides a disk having a first face comprising a first conducting region positioned centrally on the face, and a second conducting region, isolated from the first region and surrounding the first region. Each of the two conducting regions has the same area and defines a distinct capacitive gap with respective portions of the end surface of the probe, whereby the capacitive sensor is comprised of two capacitors. The probe includes spring means adjacent to the second face of the disk for applying positive pressure to the disk to hold the step in the disk in a fixed position relative to the step in the probe, whereby the periphery of the end face remains in a fixed position relative to the periphery of the disk, regardless of the melt pressure or temperature.

In various other embodiments, the invention features electronic circuitry comprising means for generating a voltage output signal that is linearly proportional to the melt pressure. The voltage output signal is substantially insensitive to parasitic capacitances associated with the capacitive sensor and is linearly proportional the melt pressure for melt temperatures ranging between 70° F. and 1000° F. The circuitry further comprises means for generating a second output signal proportional to the melt temperature.

The electronic circuitry further comprises means for generating a first signal based on the capacitance of the capacitive sensor, means for generating a second signal based on the melt temperature, and means for generating the output signal based on the first and second signals. The means for generating the output signal employs a predetermined functional relationship between capacitance, temperature, and pressure. The first signal is substantially insensitive to parasitic capacitances associated with the capacitive sensor. The parasitic capacitances are associated with the mechanical structure connecting the capacitive sensor to the means for generating the first signal. The means for generating the first signal renders the first signal substantially insensitive to the parasitic capacitances by energizing the mechanical structure in a manner such that the parasitic capacitances produce no signal.

In various other embodiments the invention features electronic circuitry comprising means for generating a second signal based on the melt temperature, means for generating a linearization signal based on the first and second signals, and means for adding the linearization signal to the first signal to produce the output signal, which is linearly proportional to the melt pressure. The linearization signal indicates the difference between the first signal, as it relates to the measured capacitance of the capacitive sensor, and the desired linearized output signal. The means for generating the linearization signal employs a predetermined functional relationship between capacitance, temperature, and pressure.

In another aspect, the invention features a melt processing machine associated with means to provide heated, pressurized melt within the machine; the melt being useful in cooled state for forming solid objects. The machine includes a wall for confining the pressurized melt and a probe for insertion through an aperture in the melt-confining wall of the machine. The probe has a pressure-deflectable end surface for contact with pressurized melt, and a pressure-resistent securing means for fixing the probe in the wall with the end surface of the probe exposed for contact with the melt in a non-flow obstructive relationship. The probe also has a seal surface on the probe between the end of the probe and the securing means, for cooperative sealing action with a mating sealing means associated with the wall to prevent exposure of the melt to the securing means. The probe also has pressure detection means internal of the probe which are responsive to deflection of the end surface of the probe, for detecting pressure of the melt. The pressure detection means comprises a temperature-compensated capacitive sensor; one plate of the capacitor being defined by the end surface of the probe exposed to the melt and the opposite plate of the capacitor being mounted within the probe in spaced relation to the end surface. A capacitive gap is defined by the end surface and the opposite plate. The probe also has electronic circuitry remote from the melt-exposed end of the probe and connected to the capacitor in manner to compensate for change of temperature effects on the capacitor and to generate an output signal proportional to the melt pressure. The circuitry also comprises circuitry mounted within a portion of the probe to generate a signal proportional to the capacitance of the capacitive sensor.

The invention provides a transducer which accurately measures melt pressure throughout a wide temperature range. The output signal of the transducer is linearly proportional to the melt pressure, and is operable at both low and high frequency.

BRIEF DESCRIPTION OF THE DRAWINGS

This invention is pointed out with particularity in the appended claims. The above and further advantages of this invention may be better understood by referring to the following description of a preferred embodiment taken in conjunction with the accompanying drawings, in which:

FIG. 7a is a longitudinal cross sectional view of the assembly of the diaphragm, ceramic disk, and outer end of the connecting body, called a "snout tip", before mechanically joining the diaphragm and snout tip in one embodiment.

FIG. 7b is a view similar to FIG. 7a of the assembly of the diaphragm, ceramic disk, and snout tip after mechanically joining the diaphragm and snout tip.

DETAILED DESCRIPTION

Figure 1A:
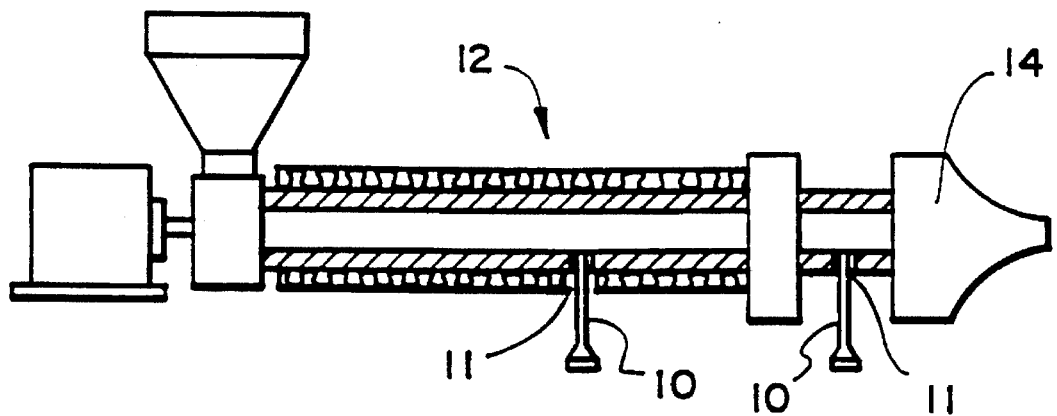
FIG. 1a is a diagrammatic illustration of a prior art extrusion system.
Figure 1B:
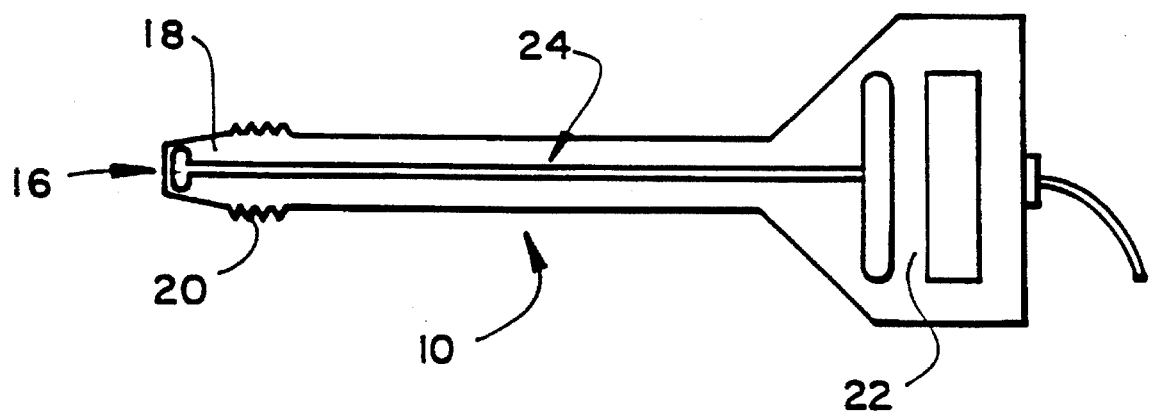
FIG. 1b is a side view of a prior art melt pressure transducer.
Figure 2A:
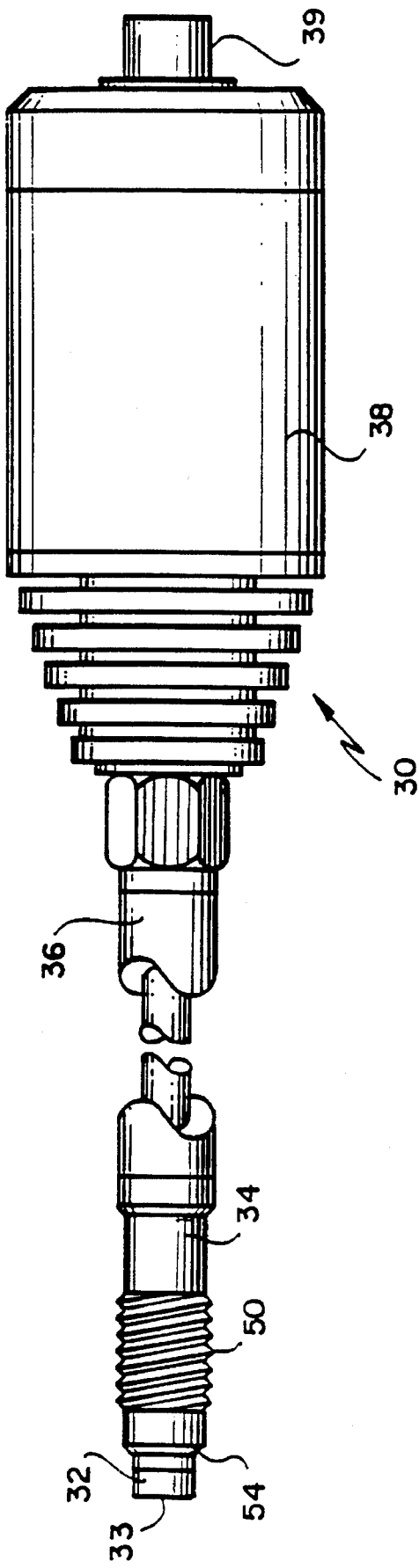
FIG. 2a is a side view, partially in cross-section of the melt pressure capacitive pressure transducer according to the invention.

Referring to FIG. 2a, the melt pressure capacitive transducer 30 of the preferred embodiment includes a multi-sectional housing, consisting of a circular diaphragm cap 32 having an integral diaphragm 33 at its end, a hollow, cylindrical connecting body 34, referred to as a "snout tip", a hollow, cylindrical extension rod 36 mechanically connected to the connecting body 34, and an electronics housing 38.

Figure 2B:
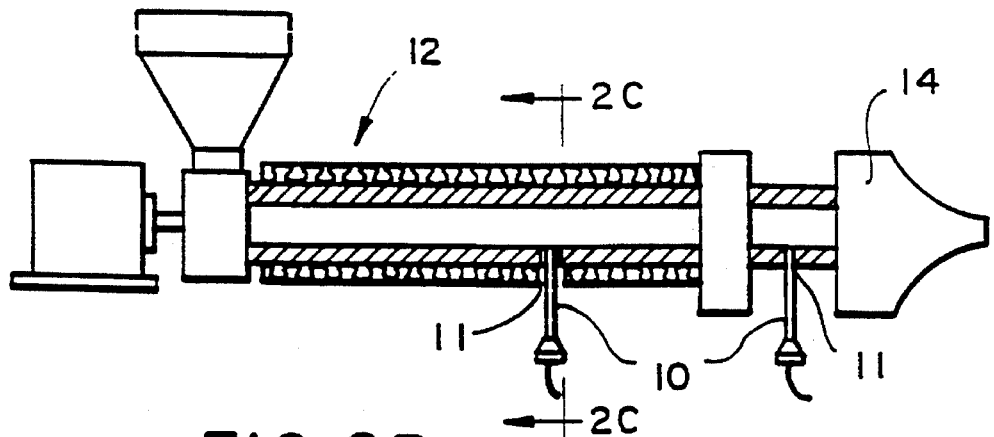
FIG. 2b is a view, similar to FIG. 1a, of an extruder system in which melt pressure capacitive transducers according to the invention are installed.
Figure 2C:
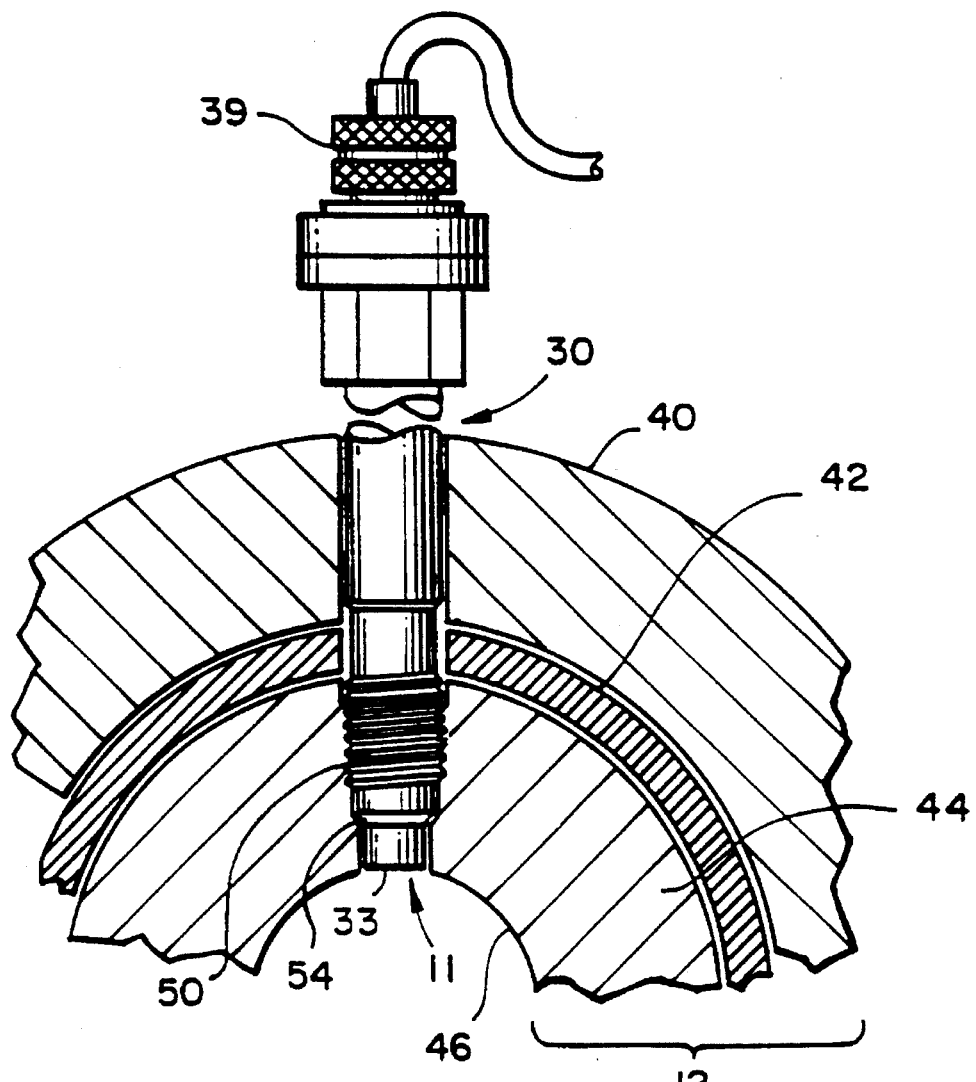
FIG. 2c is a cross sectional view taken on line 2c—2c of FIG. 2b of the extruder barrel in which a melt pressure capacitive pressure transducer according to the invention is fitted.

Also referring to FIGS. 2b and 2c, the transducer housing is designed to threadably mount within a standard extruder barrel aperture 11 of an extruder barrel assembly 12. As shown in FIG. 2b, multiple transducers 10 are installed along the length of the barrel, each providing, e.g., process control monitoring or safety checks. The extruder barrel aperture typically has a 0.375 inch-wide opening into the extruder bore 46 and includes a 2 to 4 inch-thick steel extruder barrel 44, a surrounding 0.5 inch-thick heater band 42 and a 2 inch-thick layer of insulation 40. The extruder barrel 44, has an inner surface which defines the extruder bore 46. The bore 46, having a diameter between 1 inch and 6 inches, which surrounds a driven extruder screw; the screw works the semi-molten material under high pressure and delivers it in melted form to an outlet such as an extruder die.

Outer threads 50 on the transducer snout tip 34 engage with corresponding mounting threads in the extruder aperture 11 when the transducer is rotated down into the extruder aperture. When the beveled edge surface 54 of the snout tip seals properly on a mating surface of the extruder barrel, the radial position of the diaphragm 33 on the end of the diaphragm cap 32 is tangent with the inner wall of the barrel bore 46. This seating edge surface 54, provides the seal against the corresponding edge in the aperture 11, which, in addition to limiting the transducer's inward travel, prevents escape of the melt around the transducer housing to the threads. Precise positioning of the transducer diaphragm is necessary because protrusion of the diaphragm into the barrel bore would subject it to abrasive wear by the melt and possible damage by the passing extrusion screw, while excessive recession would provide a space in which material could stagnate, degrade, and harm the process as well as the diaphragm itself. If necessary, a shim of some appropriate material may be sandwiched between the two seating surfaces to act as a spacer for backing off the transducer diaphragm from the barrel bore to the proper position.

The length of the transducer extension rod 36 is chosen to ensure that the electronics housing 38 is held beyond the extruder assembly, thereby distancing the electronics from the melt temperature, which could reach 1000° F. Because a typical extruder barrel assembly has a width of approximately 4.5 inches, a transducer length of not less than 6 inches is preferred. As discussed below, depending on the length of the transducer body and the temperature of the melt, it may be necessary to locate some portion of the electronics remotely from the extruder assembly. An electrical connector 39 provides the pressure output signal of the transducer and may be used to connect the transducer housing to any remote electronics.

The transducer diaphragm cap 32, diaphragm 33, and snout tip 34, are all preferably formed of a material which exhibits high yield strength and good creep resistance at the maximum operating temperature (e.g., up to 1000° F). Additionally, the modulus of the material should be minimally dependent on temperature, and preferably have a linear temperature dependence to simplify the required temperature compensation scheme. As described below, the material may be either electrically conductive or insulating, depending on the design of the transducer's internal elements. As an example, a metal alloy, such as nickel alloy (sold under the name Inconel 718 by Inco Alloys, Inc.), provides the desirable mechanical characteristics mentioned. Given that the other housing sections are formed of an electrically conducting alloy, like Inconel 718, the electronics housing 38 would preferably also be of an electrically conducting material, such as aluminum.

Figure 3A:
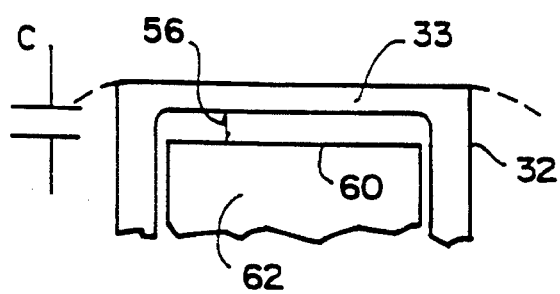
FIGS. 3a and 3b are diagrammatic illustrations of the capacitive scheme employed in one embodiment of the invention.

Referring now to FIG. 3a, the operating principle of the capacitive pressure transducer is as follows. The diaphragm 33 at the end of the transducer's diaphragm cap 32 forms a capacitive gap 56 with the end face 60 of a fixed plate 62 held within the transducer housing (shown schematically in FIG. 3a). Thus, the diaphragm 33 and fixed plate face 60 each act as one plate of a capacitor, having some capacitance C. To electrically function as capacitor plates, the inner face of the diaphragm 33 and the plate end face 60 must both be electrically conducting, and have isolated electrical connections to differing potentials.

Figure 3B:
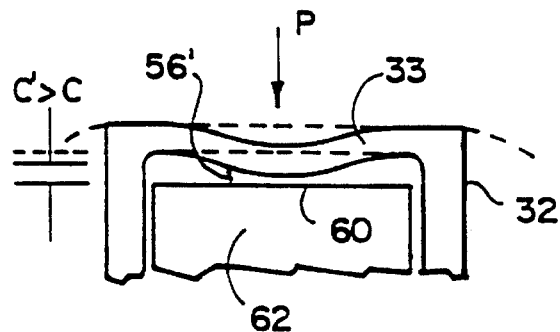

Given that the diaphragm is formed of a flexible material, when it is exposed to a flowing molten material in, e.g., an extrusion barrel, the diaphragm deflects away from the melt in response to the melt pressure P, as shown in FIG. 3b. This diaphragm deflection decreases the capacitive gap 56 to a new gap 56', which changes the original gap capacitance C to a larger capacitance C'. Because the gap capacitance is generally proportional to the pressure P on the diaphragm, electrical sensing of the gap capacitance and any capacitance change provides a scheme for monitoring the melt pressure on the diaphragm. In this way, after appropriate linearization, that accommodates the conditions of use, described below, the transducer is found to provide a highly accurate and stable melt pressure measurement technique which overcomes the downfalls of the prior melt pressure measurement techniques.

Figure 4A:
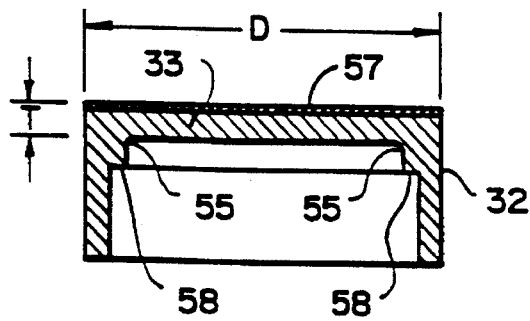
FIG. 4a is a longitudinal cross sectional view of the diaphragm employed in one embodiment of the invention.

Considering the transducer diaphragm in more detail, FIG. 4a illustrates one possible design for the diaphragm cap 32 and diaphragm 33. The diaphragm diameter D is chosen to be less than the standard extruder barrel aperture opening, which is 0.375 inch in diameter; for example, D is chosen to be 0.312 inch. The inside corners 55 of the diaphragm cap are rounded to reduce bending stress concentrations on the diaphragm 33, which acts to reduce cyclic fatigue of the diaphragm, and to provide a rigid boundary for the diaphragm as it deflects inward. A step 58 below the cap corners 55 is designed based on the predicted temperature-induced expansion of the cap material, to be explained below. The step also relieves the stress concentration placed on the diaphragm rim.

Figure 4B:
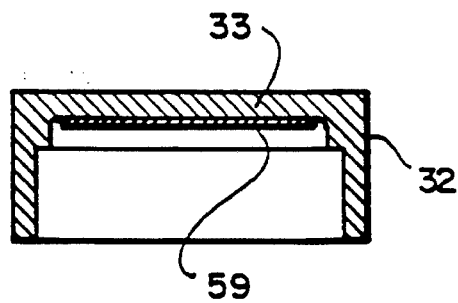
FIG. 4b is a longitudinal cross sectional view of a second diaphragm which may be employed in the invention.

The inner face of the diaphragm 33 must be conductive because it acts as a capacitor plate. Thus, a conducting material, such as the nickel alloy, Inconel, described above as having the necessary high-temperature mechanical properties, might be used for the whole cap 32. The outer face of the diaphragm 33 which is exposed to the melt flow may be plated with a protective layer 57 to provide increased wear resistance against abrasive particulates in the melt. A preferable plating material is electroless nickel. Referring also to FIG. 4b, an insulative material, such as alumina, might alternatively be used for the diaphragm cap; alumina exhibits excellent high-temperature wear properties. In this case, a conductive coating 59, such as moly-tungsten or nickel, must be plated on the inside face of the diaphragm 33 to render it conducting, and electrical connection must be made to this coating within the transducer housing.

The total thickness T of the diaphragm 33 is chosen based on the pressure range to be monitored and the mechanical strength properties of the diaphragm. In particular, the diaphragm must be thick enough to ensure that its yield strength is not surpassed during the full scale pressure operation. For example, given an overload safety factor of 1.5 and a nickel alloy diaphragm plated with nickel, a full scale pressure of 1000 psi would require a 0.014 inch-thick diaphragm, while a full scale pressure of 20,000 psi would require a 0.060 inch-thick diaphragm.

Figure 5A:
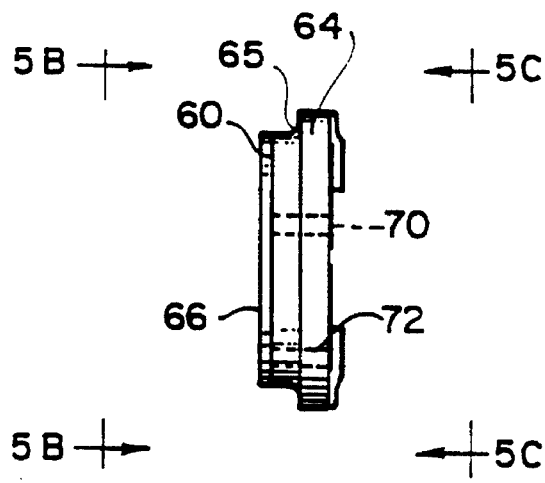
FIG. 5a is a side view of the ceramic disk employed in one embodiment of the invention.
Figure 5B:
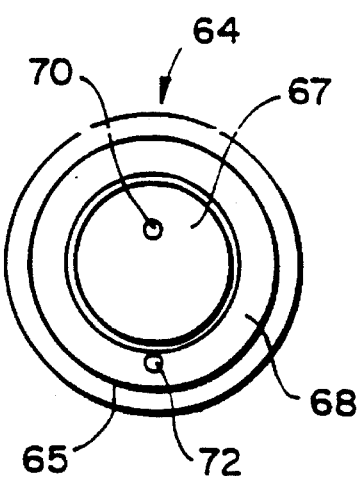
FIG. 5b is an end view taken on line 5b—5b of FIG. 5a of the front face of the ceramic disk.

Referring now to FIGS. 5a and 5b, the second plate which forms a capacitor with the transducer diaphragm is the end face 60 of a fixed disk 64. As explained below, the disk 64 is mounted within the transducer housing in a predetermined spaced relation to the transducer diaphragm. The disk material must be stable at high temperatures. In addition, if the diaphragm and diaphragm cap are of a conductive material, the disk must be insulating to prevent electrical shorting of the two capacitor plates. A ceramic, such as alumina, is a good disk material.

As shown in FIG. 5a, the step 65, in conjunction with the diaphragm cap step 55, defines the capacitance gap. This combination also acts to exhibit predictable temperature-induced mechanical characteristics; the analysis of this design is discussed below.

The end face 60 of the ceramic disk is coated with an electrically conductive layer 66, which forms the conductor for the second capacitor plate. This layer may be continuous across the surface of the end face, or as shown in FIGS. 5a and 5b, the layer 66 may be discontinuous, having, for example, a center circular region 67 which is electrically isolated from an outer annular region 68. The two conducting regions are of equal area. Each conducting region face forms a distinct capacitor with the corresponding portion of the transducer diaphragm. Thus, the inner region 67 defines a central capacitor, around which is an annular capacitor defined by the outer region 68. This dual capacitor scheme has advantageous temperature-compensation features, to be explained below, but is not essential in all cases; a single capacitor scheme would also be feasible under certain circumstances.

Electrical connections are made to the isolated conducting regions on the disk end face via holes 70, 72 through the disk; one hole 70 connecting to the inner region 67 and the other hole 72 connecting to the outer region 68. In manufacture of the disk, the connecting holes 70, 72 are first drilled, and then a conductive coating is deposited on the disk end face and through the holes, by e.g., screen printing, evaporation, or sputtering. The coating must withstand a continuous high-temperature environment while remaining adhesively bonded to the disk. A composite layer coating of, for example, 0.0005 inches of moly-tungsten, 100 microinches of nickel, and 75 microinches of gold provides excellent high-temperature characteristics. The moly-tungsten is screened onto the disk, then baked, and lapped flat. The nickel is then deposited, followed by the gold coating, which is applied to prevent oxidation of the underlaying materials.

Figure 5C:
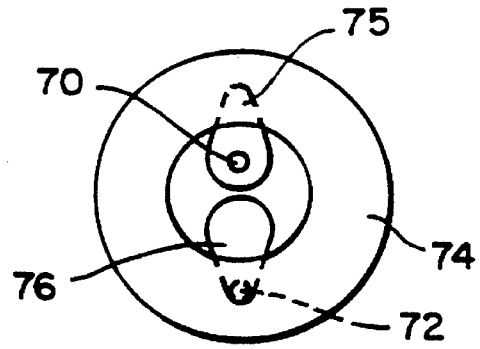
FIG. 5c is an end view taken on line 5c—5c of FIG. 5a of the back face of the ceramic disk.

Physical connection is made to the coated holes 70, 72 on the back face of the disk, as shown in FIG. 5c. Over these plated holes is deposited a conducting layer of composite materials identical to those on the end face of the disk, i.e., moly-tungsten, nickel, and plated gold, to form two bonding pads 75, 76, one pad 75 for the inner capacitor's hole 70 and the other pad 76 for the outer capacitor's hole 72. After the bonding pads have been coated, a high-temperature insulative film, for example, 0.001 inch-thick glass, is deposited in an annular pattern 74 which covers a portion of the bonding pads to electrically isolate their outer periphery from the inner wall of the snout tip, which is conductive.

Figure 5D:
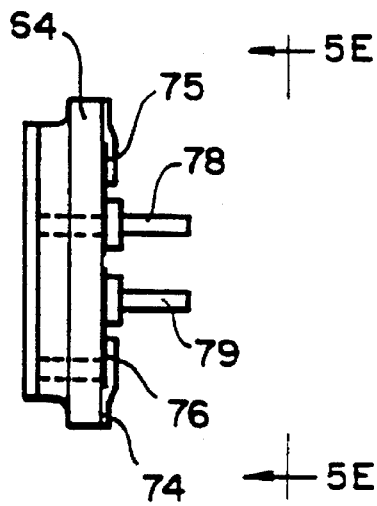
FIG. 5d is a side view of the ceramic disk of FIG. 5a with terminal pads in place.
Figure 5E:
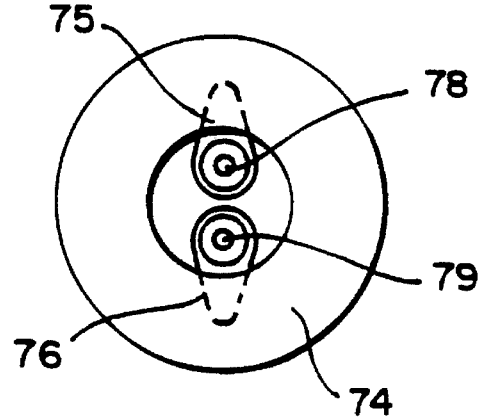
FIG. 5e is an end view of the back face of the ceramic disk with terminal pads taken on line 5e—5e of FIG. 5d.

As shown in FIGS. 5d and 5e, nail-head terminals 78, 79 are brazed to the bonding pads 75, 76, respectively, on the back face of the disk (FIG. 5e). Each terminal is thereby electrically connected to its respective conductive region on the disk end face by a corresponding bonding pad and disk hole.

Figure 6A:
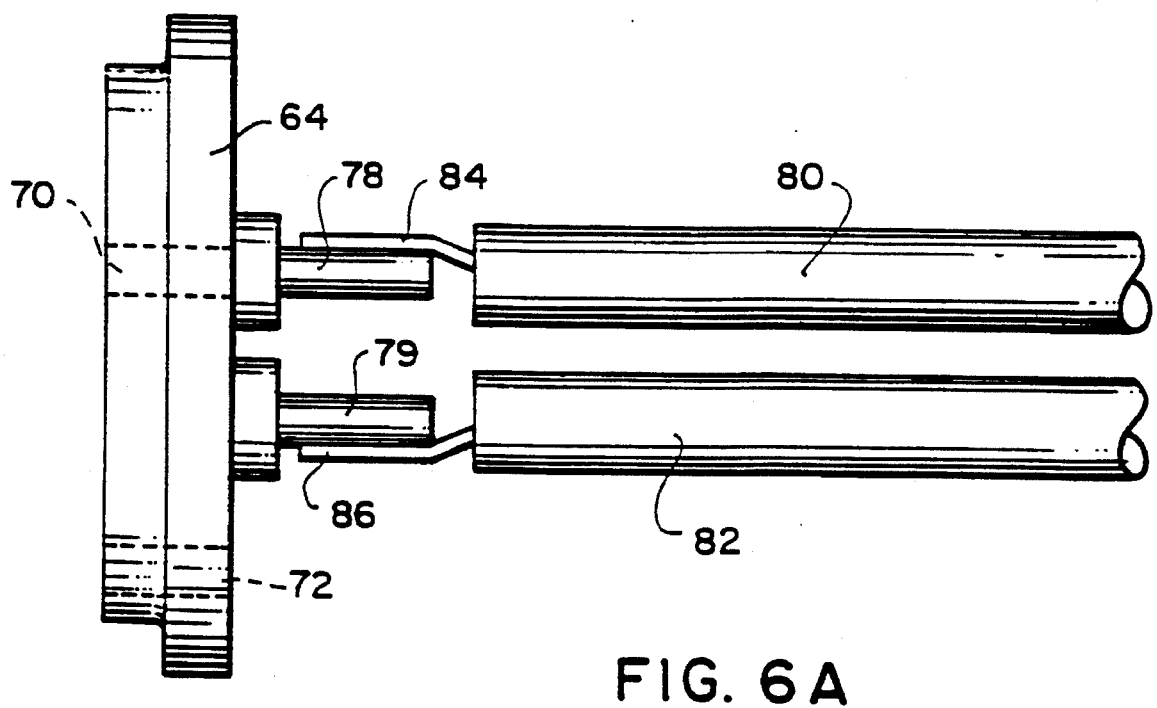
FIG. 6a is a side view of the ceramic disk with electrical connections to cables employed in one embodiment.
Figure 6B:
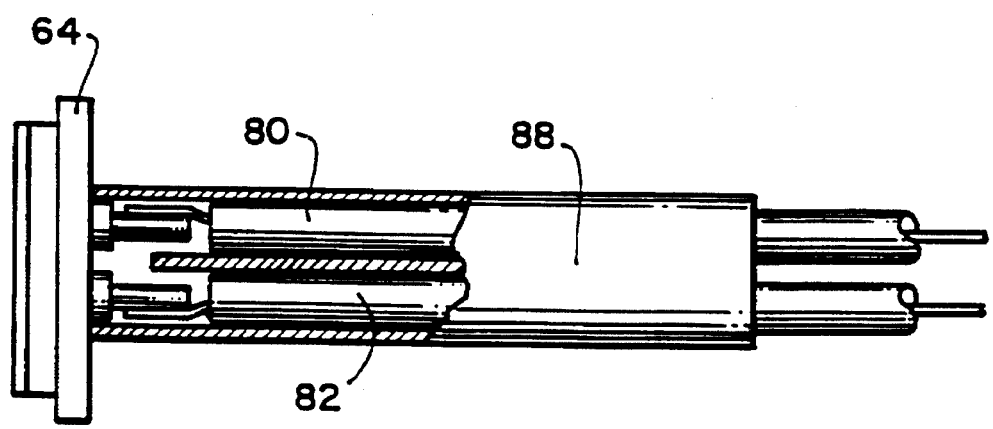
FIG. 6b is a side view, partially in cross-section, of the ceramic disk and cables after electrically connecting and mechanically bonding in one embodiment.

Now turning to FIG. 6a, each of the two nail-head terminals 78, 79, is brazed to an insulated and shielded, high-temperature cable 80, 82, respectively, e.g., similar to a thermocouple cable. The cables 80, 82 each consist of a conducting cylindrical shield in which a center wire 84, 86, respectively, is held by a densely packed dielectric powder, such as magnesium oxide (not shown). Once the cable wires 84, 86 are brazed to the disk terminals 78, 79, a two hole ceramic rod 88, shown in FIG. 6b, is slipped over the cables to abut the back face of the disk 64. This ceramic rod, of about 1 inch in length, serves to limit the cables' motion and hold them fixed and electrically isolated within the transducer housing. A high-temperature ceramic adhesive, such as Zircon adhesive, may be beaded around the disk-rod interface and at the rod end to further fix the rod and cable positions.

As shown in FIG. 7a, the transducer's diaphragm and disk plates are positioned by first sliding the disk-rod assembly 64, 88, into the snout tip 34 until the back face of the disk 64 is in contact with the flat end 90 of a triangular spring section 92 formed as an integral portion of the snout tip 34. The disk 64 and snout tip are then guided into the diaphragm cap 32 until the step 65 in the disk meets the step 58 in the diaphragm cap. A spacer washer 93 may optionally be sandwiched between the two steps. Now in place, the diaphragm and rod end face define a capacitive gap 56. Because the gap width is predetermined by the heights of the diaphragm and disk steps 58, 65, the spacer washer 93, which is custom sized, may be selected to compensate for variable machining tolerances in the diaphragm and disk dimensions. If so, the washer height is specified by the difference between the actual gap width, as initially observed without the washer 93 in place, and the gap width design.

This gap width design is chosen based on the predicted behavior of the diaphragm with pressure. For a given diaphragm thickness and pressure range, the relationship between capacitance and pressure for a small gap is more sensitive and more nonlinear than for a larger gap. Thus, the gap width is chosen such that for the predicted full-range of diaphragm deflection, the change in gap capacitance as a function of pressure is not more nonlinear than from some fraction, for example, 15%. Using this example, the 15% limit prescribes that for a diaphragm full-scale deflection range of 0.001 inches, the gap design be set at 0.0015 inch, thereby ensuring that the capacitance function is never more than 15% nonlinear.

Returning to FIG. 7a, when the disk-rod assembly is first positioned in the diaphragm cap 32, a peripheral gap 98 exists between the cap 32 and the snout tip 34. When the cap 32 is forcibly pushed against the snout tip to close that gap 98, the triangular spring section 92 of the snout tip compresses and bends back into the spring gap 94. Acting as a spring, the compression of the section 92 applies a positive pressure on the disk step, holding it firmly against the diaphragm step with sufficient pressure over the full scale temperature and pressure range. Once the peripheral gap 98 between the diaphragm cap and snout tip is held closed, the interface between the two is tack welded and then electron-beam welded to produce a strong mechanical connection.

In operation, change in temperature at the transducer tip causes the diaphragm and disk materials to expand or contract, typically to differing degrees; each material has a unique thermal coefficient of expansion. For example, nickel alloys expand to a much greater extent than alumina ceramic. Thus, a nickel alloy diaphragm cap would expand away from an alumina disk. The snout tip spring 92 is designed to provide enough pressure on the disk against the diaphragm cap step so that the two plates are held forcibly together regardless of any differing temperature-induced mechanical movements. As an alternative spring mechanism to the integral spring section 92 of the snout tip, a small discrete spring, e.g., disk spring or coil spring, may be used to hold the disk in place, with the requirement that the spring withstand high temperatures.

The temperature-induced expansion of the nickel alloy diaphragm and ceramic disk causes the capacitive gap to become larger at higher temperatures; the diaphragm step 58 expands more than the disk step 65, thereby increasing the gap 56 between the two capacitive plates. As mentioned above, a larger capacitive gap renders the capacitor less sensitive to pressure than a smaller gap. This temperature-dependent gap change is employed to compensate an opposing temperature-dependent change—that of the diaphragm flexibility.

The modulus, E, of the diaphragm material is dependent on temperature; indeed, the modulus of most materials decreases with an increase in temperature. Such a reduction in modulus causes a decrease in flexural stiffness of the diaphragm. Thus, the diaphragm is more flexible at higher temperatures than at lower temperatures. Increased diaphragm flexibility results in a capacitive function which is overly sensitive to pressure.

The temperature-induced gap expansion is employed to counter this temperature-induced diaphragm flexibility in the following way. The diaphragm and disk step heights are preselected so that the diaphragm cap expands with temperature increases relative to the disk by an amount which decreases the capacitive gap sensitivity by just the amount of sensitivity increase caused by the temperature dependent increase in diaphragm flexibility. By precisely positioning the two opposing sensitivity mechanisms against each other, the transducer passively compensates for changes in melt temperature effects during operation. Practically, the optimum step height is determined by equating the step height, H, to the functional interrelationship between the temperature, diaphragm's modulus, E, modulus reduction with temperature (dE/dT), maximum diaphragm deflection, $Y_{max}$, capacitive gap spacing, h, and thermal expansion coefficients for the diaphragm 33 and ceramic disk 64, $\alpha_1$ and $\alpha_2$, respectively. This interrelationship is then given as:

$$H = (1/(\alpha_1-\alpha_2)) \times (-Y_{max}(1/E)(dE/dT) + h\alpha_2).$$

As an example, the optimum step height, H, is calculated to be 0.060 inches for a 1000 psi pressure range, employing Inconel 718 as the diaphragm material and Alumina as the ceramic disk material.

The purpose of the two capacitors defined by the two conducting regions (67, 68 FIG. 5b) of the conductive layer on the disk's end face may now be explained with regard to temperature-induced changes in the capacitive gap. For a given pressure, a temperature-increased larger capacitive gap produces a smaller capacitance than that of a smaller, gap at a lower temperature. Thus, a single gap capacitor would inaccurately measure the same pressure differently at different temperatures.

As described above, the two conducting regions define an inner, circular capacitor, $C_i$, and an outer, annular capacitor, $C_o$, with the transducer diaphragm. These capacitors are used in a dual capacitance-measurement scheme to provide further temperature compensation as follows. When the diaphragm is undeflected at zero pressure, the two capacitances are equal because their conducting regions are of equal area and each has the same opposing capacitive plate; $C_i - C_o = 0$ at zero pressure. Remaining at zero pressure, but at a higher temperature, and correspondingly larger gap, the two capacitances are still equal to each other because the temperature-induced gap expansion is uniform across the face of the diaphragm. Thus, at zero pressure, the difference between the two capacitances is zero for any temperature. This provides a passive mechanism for eliminating temperature-induced drift of the transducer's zero pressure point.

In operation, when a pressure, P, is applied to the diaphragm, the inner capacitance $C_i$ is larger than that of $C_o$, or $C_i - C_o > 0$, because the diaphragm flexes more at its center than at its radial periphery, thereby decreasing the inner capacitive gap more than the outer gap. In fact, the outer capacitor $C_o$ varies quite little with pressure. The outer capacitor thereby acts as a reference capacitance which is subtracted from the inner, or sense, capacitance, $C_i$ to determine the capacitive relationship to pressure with the effect of temperature canceled out.

Figure 8:
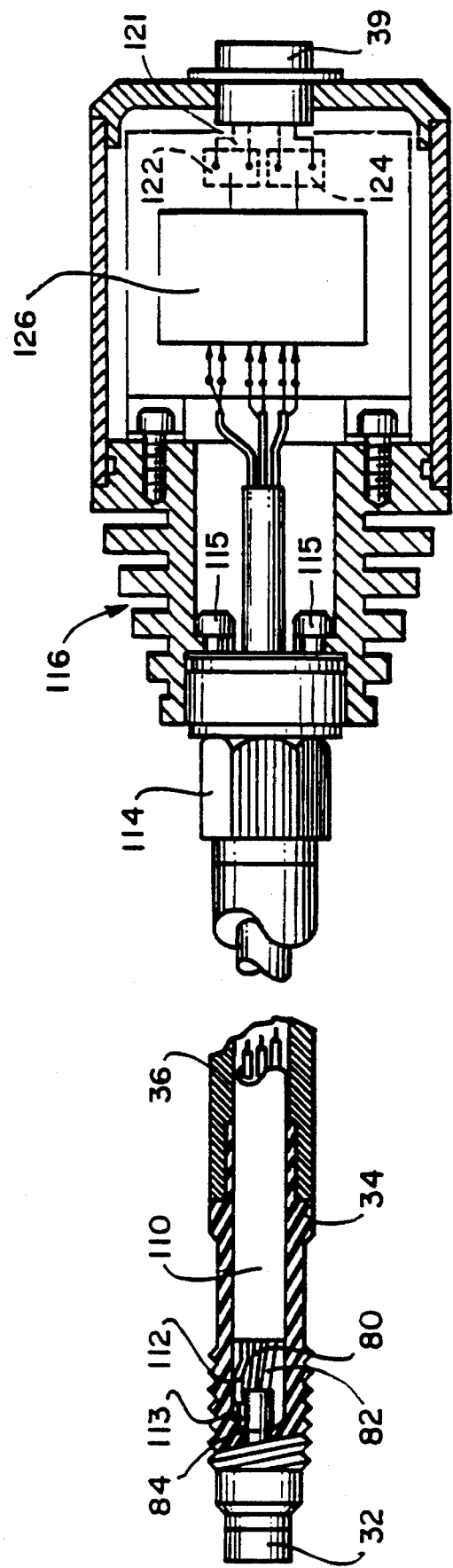
FIG. 8 is a side view, partially in cross-section, of the cables within the extension rod.

Now turning to FIG. 8, once the diaphragm cap 32 is welded to the snout tip 34, the cables 80, 82 connecting to the inner and outer capacitor plate disk regions $C_i$ and $C_o$ are interfaced with the electronics within the transducer housing. The cables are drawn from the end of the two hole ceramic rod 84 through an extension tube 36, and connected to electrical terminals within the electronics housing. The extension tube 36 is of a length, e.g., 10 inches, that is sufficient to hold the electronics beyond the periphery of the extrusion barrel. The tube does not need to be made of the same alloy material as that of the diaphragm and snout tip.

The extension tube 36 is TIG welded to the snout tip 34 at its left end, and at its right end, is TIG welded to a hex connector 114, which serves to connect the electronics housing 38 to the extension tube, as well as to provide a point on the tube for torquing the transducer into an extrusion barrel aperture. Within the housing, screws 115 mechanically fix the connector to the housing. The electronics housing includes fins 116 along the left portion of its outer walls to provide additional housing surface area for dissipating heat, via free or forced convection, that conducts from the diaphragm in the melt through the transducer body to the electronics housing.

Optionally, a second ceramic rod 110 may be positioned within the extension tube 36 to carry the cables 80, 82 such that their distance from the tube wall, and distance between each other, is maximized, thereby decreasing any stray distributed capacitances that might accumulate along the length of the cables. The effect of any such capacitance is further, actively eliminated by the electronics, as described below.

A thermocouple cable 112, e.g., a shielded two-wire cable, is also carried by the second ceramic rod 110. This cable 112 is held within the rod 110 only along the transducer body to the point of the junction of the two hole rod 84, where the thermocouple cable is then positioned between the outside of the two hole ceramic rod 84 and the snout tip 34. The tip 113 of the thermocouple is forced into the inner wall of the snout tip body to make good thermal contact with it. A temperature-dependent signal is generated by the thermocouple and is used, as described below, to provide active temperature compensation for the capacitive signal to improve performance beyond that achieved by the passive compensation scheme described above. The ceramic tube 110 carrying the thermocouple and two capacitor cables might be, for example, a four hole ceramic rod, with one of the holes left empty. Such a rod would effectively isolate each cable from each of the others, as well as from the extension tube wall. At the end of the extension rod, within the electronics housing, electrical connection is made from the thermocouple wires, each of the capacitor cable wires, and each capacitor cable shield to the electronic circuitry by soldering each wire to its corresponding lead on a printed circuit board within the electronics housing.

Input power and output signals are supplied to and taken from the electronics via an electrical connector 39. Wires 121 make connection from the electrical connector to corresponding leads on a printed circuit board. This provides positive and negative power input signals 122, and positive and negative output signals 124. Depending on the specific implementation of the circuitry, one or more printed circuit boards 126 may be employed; each board is held fixed and separated in the electronics housing by flanges.

Figure 9:
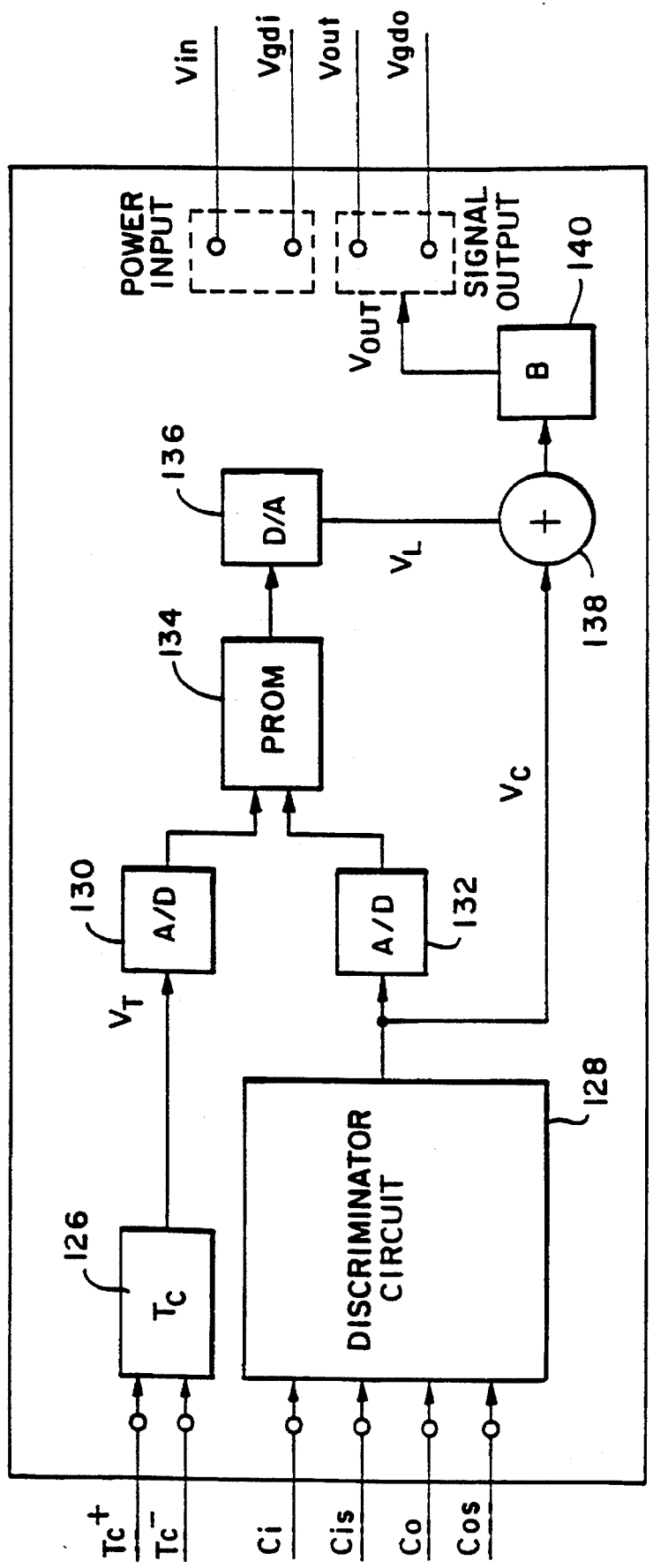
FIG. 9 is a block diagram of the circuitry in one embodiment.

Turning now to FIG. 9, the purpose of the electronic circuitry is three-fold: generation of a signal, based on measurements of capacitance, which is related to diaphragm pressure; linearization of this capacitive measurement as a function of pressure and temperature; and elimination of parasitic capacitances associated with the cables connecting to the capacitors. These are achieved using the signals mentioned above and defined in FIG. 9; $T_c^+$ and $T_c^-$ are taken from the two wires in the thermocouple, $C_i$ is taken from the inner capacitor wire, $C_{is}$ is taken from the shield of the inner capacitor wire, $C_o$ is taken from the outer capacitor, and $C_{os}$ is taken from the shield of the outer capacitor wire. The electronics housing is connected to ground. This effectively electrically grounds the diaphragm because all of the transducer sections between the diaphragm and electronics housing are conductive. Power is supplied by the signals $V_{in}$ and $V_{gdi}$, and output signals are supplied by $V_{out}$ and $V_{gdo}$.

An amplifier 127 accepts the thermocouple signals $T_c^+$ and $T_c^-$ and generates an analog voltage signal $V_T$ which is proportional to the temperature of the thermocouple tip mounted near to the transducer diaphragm. A discriminator circuit 128 accepts each of the four capacitance and shield signals $C_i$, $C_{is}$, $C_o$, and $C_{os}$, and generates an analog voltage Vc which is proportional to the difference between the inner and outer capacitors, i.e., $C_i$-$C_o$. Both signals $V_T$ and $V_c$ are digitized by respective analog-to-digital converters 130, 132. These digital signals are input to an electronically programmable read-only memory (PROM) 134, which is programmed in a manner explained below, to generate a linearization signal $V_L$. A digital-to-analog converter 136 converts the digital correction signal $V_L$ to an analog signal which is added by an adder 138 to the discriminator output $V_c$. Finally, a buffer 140 processes the addition result to produce the transducer output signal $V_{out}$.

Figure 10A:
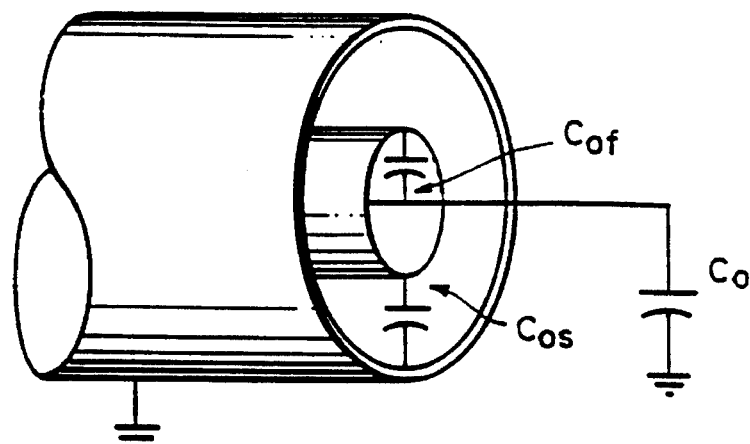
FIG. 10a schematically illustrates the capacitances associated with the capacitor cables.
Figure 10B:
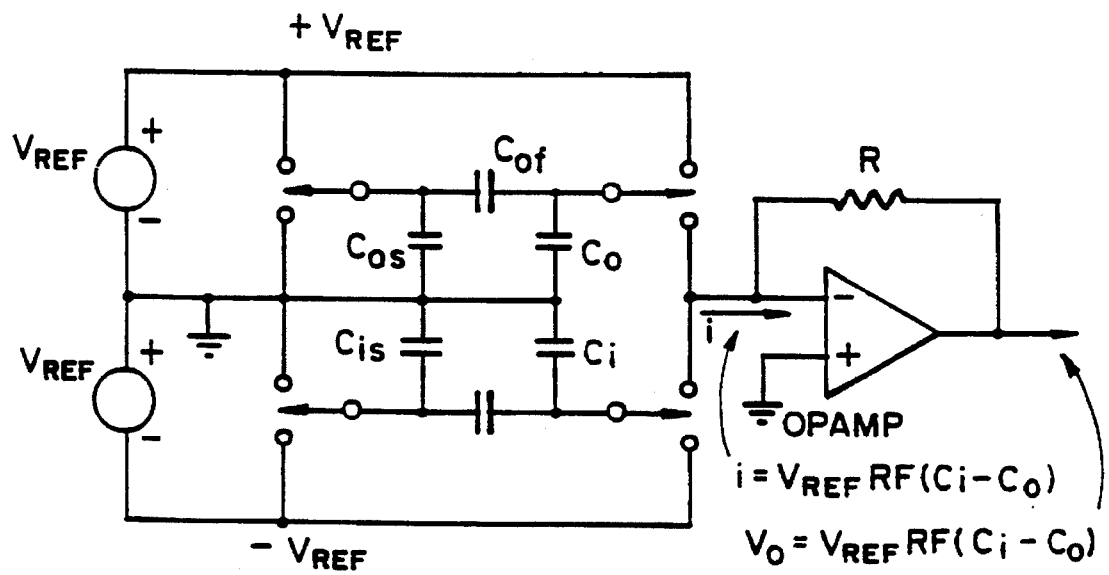
FIG. 10b diagrammatically illustrates the operation of the discriminator shown in FIG. 9.

Referring also to FIGS. 10A and 10B, the discriminator circuit provides the function of stray capacitance elimination, as well as that of generating a signal based on the difference between the inner and outer transducer capacitors, $C_i$-$C_o$. As shown in FIG. 10a, three capacitances are associated with each of the two capacitor cables; for example, the cable connected to the outer capacitor, $C_o$, supports $C_o$—between the outer capacitor wire and the diaphragm, $C_{of}$—between the outer capacitor wire and its shield, and $C_{os}$—between the shield around the outer capacitor wire and the transducer housing. The four parasitic capacitances: $C_{os}$, $C_{is}$, $C_{of}$ and $C_{if}$ can easily be between 1 and 2 orders of magnitude larger than the sense capacitances $C_o$ and $C_i$ because of the length of the transducer housing. In addition, the values of these four parasitic capacitances drift as function of time, temperature, mechanical stress, vibration, and humidity found in the environment of the melt processing machinery. Given their large size and propensity for drift, it is imperative that the signal $V_c$ output from the discriminator circuitry be insensitive to the values of these four elements.

Figure 10C:
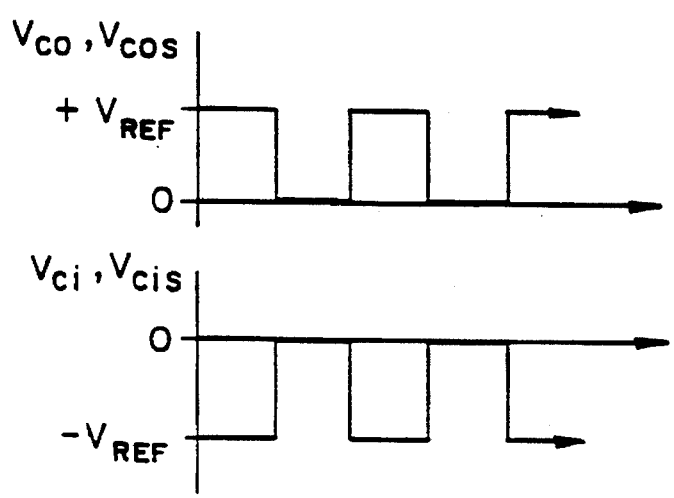
FIG. 10c illustrates the voltage signals used by the discriminator circuit shown in FIG. 10b.

Shown diagrammatically in FIG. 10b, the discriminator functions as follows. Switched voltage signals, $V_{ci}$ and $V_{co}$, shown in FIG. 10c, are applied to each capacitor, $C_i$ and $C_o$, respectively, concurrently, at a nonvarying, controlled frequency. $V_{ci}$ switches between $-V_{REF}$ and $V_g$, while $V_{co}$ switches between $+V_{REF}$ and $V_g$. $V_g$ is actually the input sensing voltage of an operational amplifier circuit (opamp) and is at virtual ground by nature of the opamp's internal connection. Likewise, switched voltage signals, $V_{cis}$ and $V_{cos}$, also shown in FIG. 10c, are applied to each shield-housing capacitor, $C_{is}$ and $C_{os}$, respectively, at the same time. $V_{cis}$ matches $V_{ci}$, while $V_{cos}$ matches $V_{co}$.

During the cycle time that the two reference voltages, $V_{REF}$ and $-V_{REF}$, are applied, all four capacitors $C_o$, $C_i$, $C_{os}$, and $C_{is}$ become charged to their respective voltages. Then during the cycle time that the two shield capacitors $C_{os}$ and $C_{is}$ are connected to ground and the inner and outer capacitors $C_o$ and $C_i$ are connected to $V_g$, the shield capacitors are discharged to ground, while the inner and outer capacitors are discharged into the opamp circuit, producing an input current, i, equal to $$V_{REF}F(C_o-C_i),$$

where F is the frequency of the voltage switching. Because the cable shields are driven with exactly the same voltage signal as the sense lines within, the cable capacitors $C_{of}$ and $C_{if}$ never have a voltage applied across them, and hence, never produce a signal. This switching scheme thus substantially eliminates all of the stray shield capacitances from the measuring circuit.

The opamp amplifies the input current signal, defined above, and converts it to a voltage signal $V_c$, equal to $$V_{REF}FR(C_i-C_o),$$

where R is the feedback resistance of the opamp, and the polarity of the input signal has been reversed.

As shown above, the voltage signal $V_c$ depends not only on ($C_i$-$C_o$), but also on $V_{REF}$, F, and R; the predictability and stability of these three variables is thus quite important. To that end, $V_{REF}$ is derived from a solid-state, temperature compensated, low-drift voltage reference, and is chosen to be as large as is commensurate with the voltage rating of the switches mentioned above, so as to maximize the magnitude of the signal $V_c$. Similarly, the frequency, F, is derived from a stable, low-drift crystal oscillator, and is chosen to be as high a frequency as is commensurate with reliable switching action.

Referring again to FIG. 9, the PROM 134, based upon prerecorded characteristics of transducer, functions to generate a signal for linearizing the discriminator output signal as a function of pressure and temperature. This correction is found necessary because, as discussed earlier, for many melt pressure applications, especially when the temperature may be anywhere in a wide range, the pressure to capacitance relation is inherently nonlinear and several temperature dependent mechanical attributes of the transducer, e.g., diaphragm flexural rigidity and capacitive gap spacing, affect the pressure to capacitance relation. The thermal expansion scheme described earlier for compensation of the diaphragm sensitivity provides a capacitive signal that is within some percentage of being linear, but is still nonlinear, because the geometry and material characteristics, e.g., thermal expansion coefficients, are themselves a function of temperature over a large temperature range. The PROM functions as a two-dimensional look-up table wherein each entry, corresponding to a particular temperature and pressure, contains the value of the signal necessary to linearize the transducer output signal.

Figure 11A:
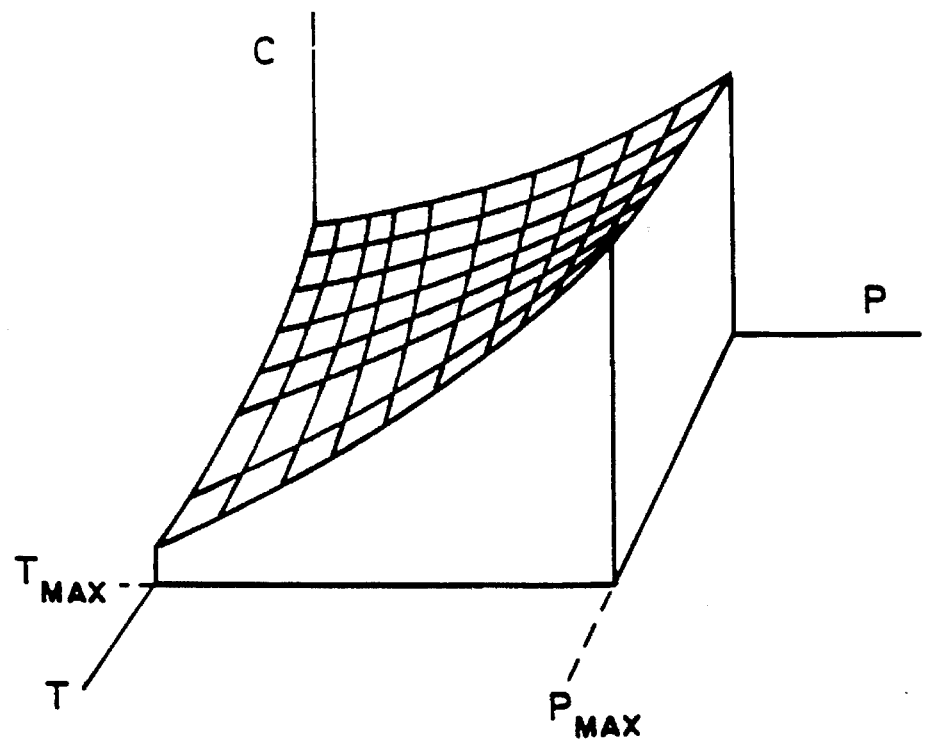
FIG. 11a illustrates the relationship for capacitance as a function of pressure and temperature.

The PROM look-up table entries are generated as follows, after computer generation of the capacitive characteristics of a given transducer. The indicated capacitance of the transducer is measured over a range of several pressure and temperature values and the resulting data is compiled for processing by a computer program. This program performs a nonlinear least-square-error parameter fit of the data to the temperature and pressure coefficients of a physically derived model for the expected behavior of the capacitance as a function of pressure and temperature. This model defines a three-dimensional surface—in temperature, pressure, and capacitance, such as shown in FIG. 11a. Based on the model, the computer program generates data values, which are burned into the PROM, to linearize the transducer pressure output over all combinations of temperature and pressure within the expected temperature and pressure ranges.

Two different schemes, each employing the PROM look-up table, may be used to linearize the transducer output. In the first scheme, the data value retrieved from the look-up table represents the value of the transducer output. Though this scheme is attractively simple, the finite size of the PROM places inherent limitations on the achievable accuracy of the output signal.

Alternatively, if the maximum nonlinearity of the transducer's sense capacitance is known, and is small, e.g., 15% of the full-scale capacitance, then a second scheme is more advantageous, for reasons discussed below. In this scheme, the PROM is programmed with the set of potential values for the difference between the capacitance signal and the desired linear output signal, and the corresponding value is added to the capacitance signal to produce the desired linear output signal.

Figure 11B:
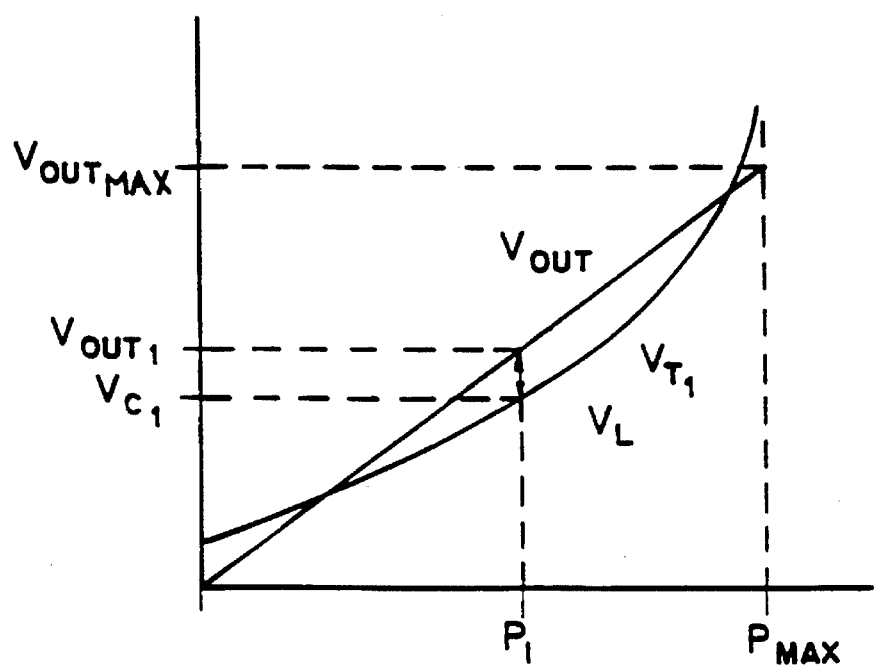
FIG. 11b illustrates the difference between a linear capacitance vs. pressure curve and one of the curves shown in FIG. 11a at a constant temperature.

For example, as shown in FIG. 11b, a particular discriminator output signal $V_{c1}$ and thermocouple amplifier signal $V_{T1}$ together indicate a particular pressure $P_1$ on the three dimensional model surface (FIG. 11a). While this surface is not linearly related to any of the three variables, C, T, and P, the desired output signal $V_{out}$ is linearly related to the variables. The difference between the indicated $V_c$ and the desired output $V_{out}$ is $V_L$, a linearization value; addition of the signal value $V_L$ to the original capacitance value $V_c$ thereby produces the desired output $V_{out}$.

Referring again to FIG. 9, in employing the second scheme discussed above, the capacitance signal $V_c$ is digitized by an 8-bit analog-to-digital converter (A/D) 130. Simultaneously, the output of the thermocouple amplifier, $V_T$, is digitized by a 7-bit A/D 132. These 15 digital lines are presented to the PROM 134 as the address code for one of the 32K×8 memory locations, which correspond to 256 capacitance entries and 128 temperature entries. This number of data entries provides a different output entry for each ½% change in capacitance or each 1% change in temperature. The data output from the PROM, which provides a value for the signal $V_L$, and which is 8 bits-long, is converted to an analog signal by a digital-to-analog converter (D/A) 136, and then added to the original capacitance signal $V_c$ by an analog adder 138.

As mentioned above, this second linearization scheme is more effective than the first because in the second, the maximum output value required of the D/A 136 to provide the necessary linearization signal $V_L$ is only a small fraction, e.g., 15%, of the of the total capacitance signal. Thus, the adder 138 may be configured to weight the D/A output ⅙th as heavily as the original capacitance signal $V_c$ to achieve a resolution of the 8-bit D/A output that is effectively multiplied by a factor of 6. In fact, it is quite feasible, using this linearization scheme, to achieve a transducer output signal having a linearity approaching 1/10%, yet requiring only 8-bit A/D and D/A's.

The look-up table signal generation technique and each of the schemes described above may be implemented, using either hardware or software, in other alternative ways, using, e.g., a computer.

The output of the adder 138 is processed by an appropriate buffer circuit 140 to filter or calibrate the output signal, as may be required for custom applications. For example, a voltage divider network may be used to calibrate the output signal voltage range to a custom range, e.g., 0 mV–30 mV, or 0 V–5 V. A filter network may be used to customize the frequency of the output signal; a laboratory application might require, for example, quite high frequency pressure indication, while a manufacturing application might prefer a slower data output. Finally, an impedance matching network may be used to match the input impedance of any remote circuit which processes the output signal. An output temperature signal (not shown) may also be interfaced with the output connector to provide temperature measurements in parallel with the pressure measurements.

Figure 12B:
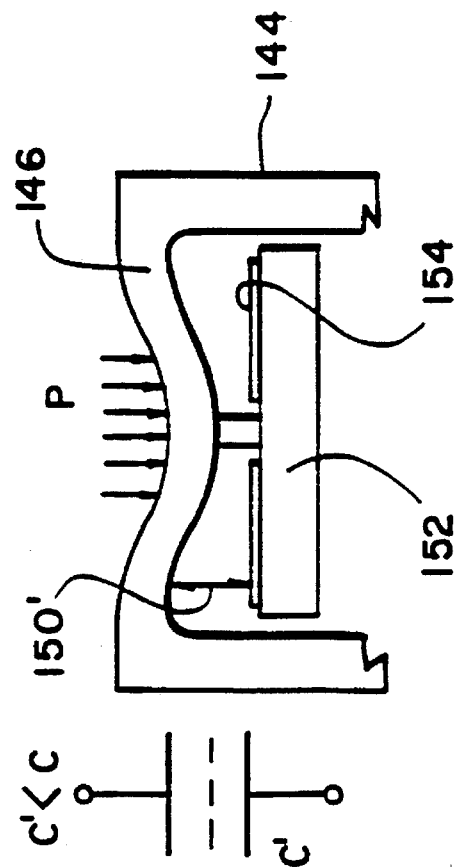
FIGS. 12a and 12b are diagrammatic illustrations of the capacitive scheme employed in a second embodiment of the invention.
Figure 12A:
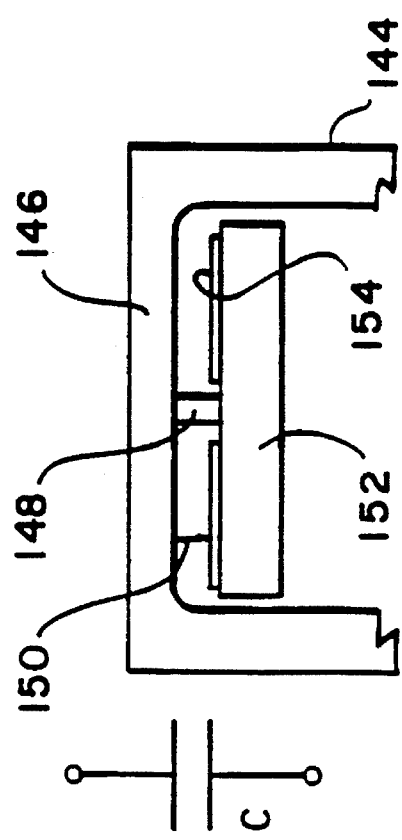

Referring to FIG. 12a, the operating principle of a second embodiment for the pressure transducer is as follows. In this embodiment, as shown schematically in the figure, a plate 152 is physically attached to the center of the diaphragm 146 through a connection post 148. The rigid connection post causes diaphragm motion experienced at the center of the diaphragm to be directly transmitted to the plate. The inner face of the diaphragm 146 and the plate end face 154 are both electrically conducting and are electrically isolated from each other with connections to differing voltage potentials. Thus, the diaphragm and plate face each act as one plate of a capacitor, having some capacitance C, with the diaphragm 146 providing one capacitor plate 146 and the plate end face providing the opposite capacitor plate 154.

Given that the diaphragm is formed of a flexible material, when it is exposed to a flowing molten material in, e.g., an extrusion barrel, the diaphragm deflects away from the melt in response to the melt pressure P, as shown in FIG. 12b. This diaphragm deflection increases the capacitive gap 150 to a new gap 150', which changes the original gap capacitance C to a smaller capacitance C'. Since the gap capacitance is generally proportional to the pressure P on the diaphragm, electrical sensing of the gap capacitance and any capacitance change provides a scheme for monitoring the melt pressure on the diaphragm similar to the scheme described above for the first transducer embodiment. In this way, after appropriate linearization, that accommodates the conditions of use, the transducer is found to provide a highly accurate and stable melt pressure measurement technique.

Figure 13:
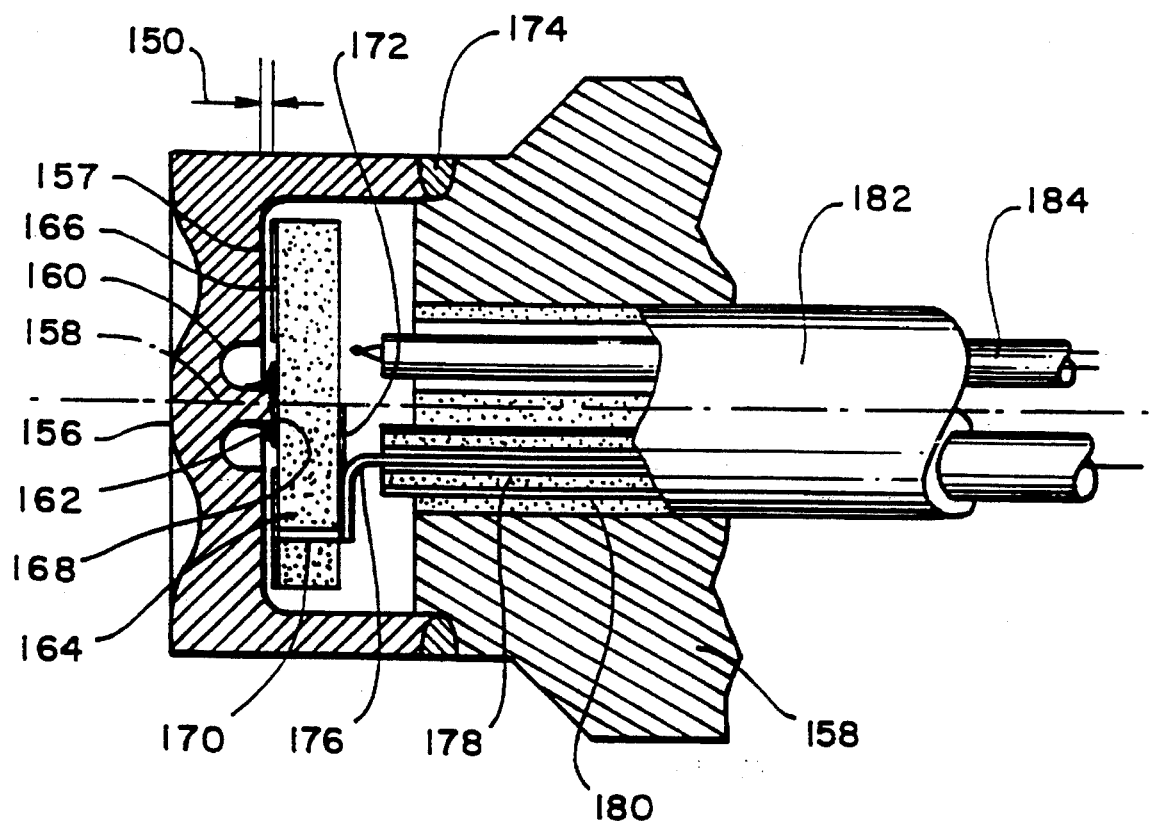
FIG. 13 is a longitudinal cross sectional view of the assembly of the diaphragm, ceramic disk, and outer end of the connecting body in a second embodiment of the invention.

Considering this "center-connect" transducer design in more detail, FIG. 13 illustrates one possible embodiment for the transducer tip assembly. The concerns for material selection of the diaphragm 156 and the ceramic disk 164 are the same as those given in the previous description of the fixed-plate concept, e.g., desirable materials properties, surface coatings, conductivity, etc. Referring now to FIG. 13, the diaphragm face 157 forms one end of the capacitor plate and the ceramic disk face 166 forms the other end of the capacitor plate. The ceramic disc is attached to the center of the said diaphragm through use of a braze material 162 that adheres to a metalized portion 168 on the ceramic disk to provide a physical connection to the disk. Other possibilities for physically connecting the disk to the diaphragm include use of a mechanical fastener mechanism, solder, or a high temperature adhesive.

The diaphragm 156 includes a rounded groove 160 to act as a strain relief on the diaphragm's central connecting portion 158. This groove acts to minimize fatigue on the braze material 162 and also to eliminate any hysteresis effects that may otherwise be caused at the bonding junction between the braze material, the central connecting portion, and the metalized central portion on the ceramic disk 166.

The capacitor spacing gap 150 can be provided by a temporary spacer during the brazing operation. Once the brazing is completed, the spacer is removed and the spacing gap is maintained. Another alternative for setting the spacing gap is to employ an insulating spacer layer that permanently remains on the disk face after the brazing operation. Yet another alternative is to conduct the brazing with no spacer present, and then after the brazing operation, to mechanically yield the diaphragm material under excessive pressure and cause it to exhibit permanent deformation. The degree of deformation would be chosen as greater than the spacing for the design pressure range.

The ceramic disk 164 includes a conducting path 170 for providing an electrical connection from the front side of the plated disk face 166 to the backside plating 172. This electrically conducting path can be provided through use of a plated through hole or a conducting strip on the outer perimeter of the ceramic disk. A conducting wire 176 is attached to the backside disk plating by employing brazing, soldering, welding or other adhesion technique that provides electrical continuity between the wire and the backside disk plating.

The conductive wire 176 is surrounded by an electrically insulating material 178 (e.g., ceramic material), and a cylindrical electrically conductive shield 180. The shield 180 is in turn insulated from the transducer housing 158 by an electrically insulating material 182 (e.g., ceramic tube). The purpose of this assembly is to provide for a guarded shield that keeps the desired sensor element capacitance measurement signal from including undesirable stray capacitance effects of the cabling system leading to the electronics. A thermocouple 184 is positioned alongside the conducting wire assembly so as to obtain a temperature measurement in the region of the capacitor. The diaphragm 156 is attached to the snout tip 158 through an electron beam weld or other suitable welding, brazing or adhesion means.

Figure 14:
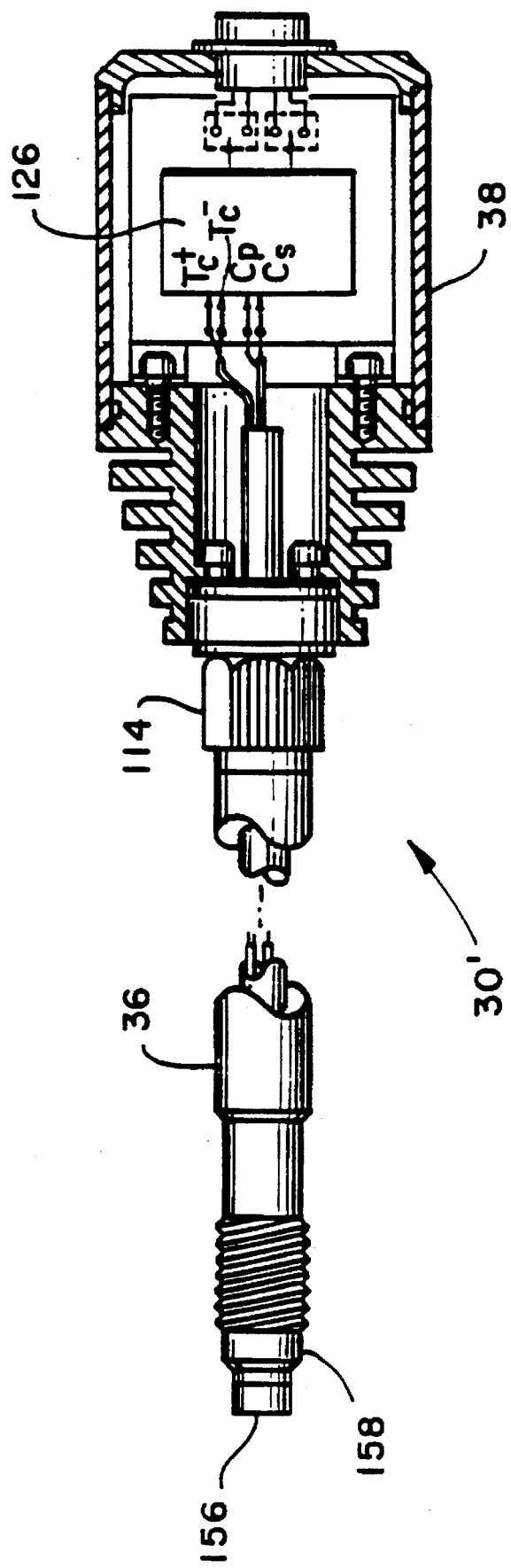
FIG. 14 is a side view, partially in cross-section, of the snout tip, connecting rod, and electronics housing in a second embodiment of the invention.

Now turning to FIG. 14, once the diaphragm 156 is welded to the snout tip 158, the conductive wire 176, cylindrical shield 180, and wires from the thermocouple 184 are interfaced with the electronics 126 within the transducer housing. The cabling and ceramic tubes lead through the entire length of the extension rod 36 to the electronics. The extension tube is TIG (Tungsten in Inert Gas) welded to the snout tip at the left end, and at its right end is TIG welded to a hex connector 114, which serves to connect the electronics housing 38 on to the extension tube and to provide a point on the tube for torquing the transducer into an extrusion barrel aperture.

As shown in FIG. 14, four electrical connections are made to the printed circuit board 126 in the electronics housing, namely, $T_c^+$ and $T_c^-$, corresponding to the thermocouple signal, and $C_p$ and $C_s$, corresponding to the plate capacitor signal and the signal for the shield around the capacitor cable. Referring also to FIG. 9, note that in this embodiment, two, rather than four, capacitor connections are required because the probe diaphragm and disk together comprise one, rather than two, capacitors, as in the first embodiment.

The capacitor charging and signal linearization schemes discussed in connection with FIGS. 10 and 11 are slightly different than those of the first embodiment, also as a result of the difference in the diaphragm-disk capacitor design. In this embodiment, a reference capacitance, $C_{Ref}$, is developed somewhere other than at the probe diaphragm. This reference capacitor may be provided in the discriminator circuit hardware of the electronics or in some other suitable manner for generating a reference capacitive signal. Using this scheme, the effective capacitance charging circuit, shown schematically in FIG. 10b, would include $C_{Ref}$ as a replacement for $C_i$ and $C_{is}$, the inner plate capacitor and corresponding shield capacitance of the first embodiment. Accordingly, the output voltage, $V_o$, generated by the discriminator circuit, would be $V_{Ref}RF(C_{Ref}-C_p)$ in the second embodiment. Additionally, the relationship between temperature, pressure, and capacitance illustrated in FIG. 11a, when applied to this capacitor embodiment, would depend on the difference of $C_{Ref}-C_p$, rather than $C_i-C_o$, as shown in the figure.

Having shown a number of embodiments, those skilled in the art will realize many variations are possible within the scope and spirit of the claimed invention. Therefore, it is the intention to limit the invention only as indicated by the scope of the claims.

What is claimed is:

1. A melt pressure measurement device for measuring the pressure of a melted substance useful in cooled state for forming solid objects, the device comprising a probe for insertion through an aperture in a wall of a melt-containing vessel, the probe having a pressure-deflectable end portion for contact with pressurized melt, pressure-resistant securing means associated with said device for fixing the device in the wall with said end portion of the probe exposed for contact with the melt in a non-flow obstructive relationship, and a seal surface on said probe between said end portion of the probe and the securing means, for cooperative sealing action with a mating sealing means associated with the wall to prevent exposure of said melt to said securing means, and pressure detection means internal of the probe, responsive to deflection of the end portion of the probe, for detecting pressure of said melt, said pressure detection means comprising a temperature-compensated capacitive sensor having, effectively, a capacitor, one plate of the capacitor defined by the end portion of the probe exposed to the melt, the opposite plate of said capacitor mounted within the probe in spaced relation to said end portion, a capacitive gap being defined by said end portion and said opposite plate, and electronic circuitry remote from the melt-exposed end portion of the probe and connected to said capacitor in a manner to compensate for change of temperature effects on the capacitor and to generate an output signal proportional to said melt pressure, said electronic circuitry comprising circuitry means mounted within a portion of the probe to generate a signal proportional to the capacitance of said capacitive sensor and wherein said pressure-deflectable end portion of said probe at a center region has a connection member, a peripheral outer region of said end portion of the probe being substantially undeflected by said melt pressure, and thereby substantially fixed from translating as compared to the center region of said end portion of the probe, which translates axially in response to said melt pressure, said outer region of the end portion of the probe forming said one plate of said capacitor, and said opposite plate of said capacitor comprises a rigid disk having a first face joined at its center to said connection member, a conducting region on said first face, located radially outward of said connection member, forming said capacitor with said outer region of the end portion of the probe.

2. The device of claim 1 wherein said circuitry means mounted within a portion of the probe is at least six inches from the melt-exposed end of the probe.

3. The device of claim 2 wherein said electronic circuitry is entirely located within a portion of said probe remote from the melt-exposed end of the probe.

4. The device of claim 1 wherein said connection member is integral with said end portion of said probe.

5. The device of claim 4 wherein the overall end of said probe is of a circular geometry having a diameter not exceeding 0.40 inches.

6. The device of claim 1 wherein said rigid disk comprises a disk of ceramic material.

7. The device of claim 1 wherein said rigid disk comprises an insulating material and said conducting region on said disk is defined by a layer of conducting material deposited on said first face of said disk.

8. The device of claim 7 wherein said end portion of said probe comprises nickel alloy and said disk comprises a ceramic insulator.

9. The device of claim 1 wherein the end portion of said probe is contoured such that the thickness of said end portion decreases from the periphery of said end portion radially inward to a point of minimum thickness and increases from said point to said center region.

10. The device of claim 1 wherein the materials of said probe and said opposite capacitor plate are chosen such that said capacitive sensor is operative for melt temperatures ranging between 70° F. and 1000° F.

11. The invention of claim 1 further comprising a melt processing machine associated with means to provide heated, pressurized melt within the machine, said melt useful in cooled state for forming solid objects, the machine including a wall for confining said pressurized melt having an aperture in which said probe is inserted.

12. A pressure measurement device comprising a probe having a pressure-deflectable end surface and pressure detection means internal of the probe, responsive to deflection of the end surface of the probe, for detecting pressure, said pressure detection means comprising a capacitive sensor having, effectively, a capacitor, one plate of the capacitor defined by the end surface of the probe, the opposite plate of said capacitor mounted within the probe in spaced relation to said end surface, a capacitive gap being defined by said end surface and said opposite plate, means for detecting the temperature of said end surface, and electronic circuitry remote from said end surface and connected to said capacitor in a manner to generate an output signal that is linearly proportional to pressure, said circuitry including means for storing a plurality of pressure versus capacitance and temperature data that is characteristic of the device, means for generating a first signal based on the capacitance of said capacitive sensor, means for generating a second signal based on the temperature of said end surface, and means for generating said output signal using said first and second signals with a predetermined functional relationship between capacitance, temperature, and pressure, wherein said electronic circuitry further comprises means for generating a linearization signal based on said first and second signals, said linearization signal indicating the difference between said first signal, as it relates to the measured capacitance of said capacitive sensor, and the desired linearized output signal, and means for adding said linearization signal to said first signal to produce said output signal, whereby said output signal is linearly proportional to the melt pressure.

13. The device of claim 12 wherein said electronic circuitry further comprises means for generating a second output signal proportional to the melt temperature.

* * * * *